United States Patent
Jung et al.

(10) Patent No.: US 11,259,258 B2
(45) Date of Patent: *Feb. 22, 2022

(54) METHOD AND APPARATUS FOR ESTABLISHING A SET OF A PLURALITY OF SYNCHRONIZATION SIGNAL SEQUENCES TO BE USED WITH ONE OR MORE COMMUNICATION TARGETS

(71) Applicant: Motorola Mobility LLC, Chicago, IL (US)

(72) Inventors: Hyejung Jung, Palatine, IL (US); Vijay Nangia, Woodridge, IL (US); Ziad Ahmad, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 46 days.

This patent is subject to a terminal disclaimer.

(21) Appl. No.: 16/813,451

(22) Filed: Mar. 9, 2020

(65) Prior Publication Data
US 2020/0213962 A1     Jul. 2, 2020

Related U.S. Application Data

(63) Continuation of application No. 16/009,634, filed on Jun. 15, 2018, now Pat. No. 10,609,665.

(Continued)

(51) Int. Cl.
*H04W 56/00* (2009.01)
*H04L 27/26* (2006.01)
(Continued)

(52) U.S. Cl.
CPC ....... *H04W 56/001* (2013.01); *H04J 11/0073* (2013.01); *H04J 11/0076* (2013.01);
(Continued)

(58) Field of Classification Search
CPC ...... H04J 11/0069–0076; H04L 5/0048–0051; H04L 27/2657–266;
(Continued)

(56) References Cited

U.S. PATENT DOCUMENTS

2017/0279553 A1* 9/2017 Sadiq .................... H04L 27/261
2018/0287844 A1* 10/2018 Kim ........................ H04L 5/005

* cited by examiner

*Primary Examiner* — Marcus Smith
(74) *Attorney, Agent, or Firm* — Loppnow & Chapa

(57) ABSTRACT

A method and apparatus provides a determination of a set of sequence values to be used as synchronization signal sequences, the set of sequence values having a predetermined length. Each sequence value in the set is based upon a first maximum length sequence having a first cyclic shift, and is based upon a second maximum length sequence having a second cyclic shift. For at least one group of possible sequence values from the determined set, where a value of a cyclic shift difference between the second cyclic shift of the second maximum length sequence and the first cyclic shift of the first maximum length sequence upon which each of the possible sequence values in the group are based are equal, a cyclic shift difference between the respective first cyclic shift value of the first maximum length upon which each of the possible sequence values in the group are based for any two of the possible sequence values in the group are larger than or equal to a threshold value, where the threshold value is determined based on an expected maximum carrier frequency offset value. The method further includes assigning each one of the determined set of sequence values to respective at least one communication target of a plurality of communication targets.

19 Claims, 6 Drawing Sheets

Related U.S. Application Data

(60) Provisional application No. 62/521,331, filed on Jun. 16, 2017.

(51) Int. Cl.
    *H04J 11/00*     (2006.01)
    *H04W 76/11*     (2018.01)
    *H04W 72/04*     (2009.01)

(52) U.S. Cl.
    CPC ...... *H04L 27/2613* (2013.01); *H04L 27/2692* (2013.01); *H04W 56/0085* (2013.01); *H04W 72/0446* (2013.01); *H04W 72/0453* (2013.01); *H04W 76/11* (2018.02); *H04L 27/2657* (2013.01)

(58) Field of Classification Search
    CPC ...... H04W 56/001–0015; H04W 56/007–0095
    See application file for complete search history.

| | MAX.{PSS-SSS CROSS-CORR. POWER NORMALIZED BY PEAK PSS AUTO-CORR. POWER WITH MULTIPLE INTEGER CFO HYPOTHESES} (1008 CELL IDS, CFO IN [-3,3] SCS, CORRELATION IN TIME-DOMAIN) | MAX.{SSS CROSS-CORR. POWER NORMALIZED BY SSS AUTO-CORR. POWER WITH CFO} (1008 CELL IDS, CFO IN [-0.5,0.5] SCS, CORRELATION IN FREQUENCY-DOMAIN) |
|---|---|---|
| MAPPING FROM CITED REFERENCE R1-1708160 | 0.2284 | 1.0319 |
| PROPOSED MAPPING ACCORDING TO EQUATION (2) AND (3) | 0.3037 | 0.4246 |

FIG. 2

METHOD AND APPARATUS FOR ESTABLISHING A SET OF A PLURALITY OF SYNCHRONIZATION SIGNAL SEQUENCES TO BE USED WITH ONE OR MORE COMMUNICATION TARGETS

FIELD OF THE INVENTION

The present disclosure is directed to a method and apparatus for the mapping of cell identities to synchronization signal sequences, and more particularly to the selection of a subset of sequence values to be used with the mapping of cell identities from a set of possible sequence values.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

While operating within a network, the standard will define the manner in which the user equipment communicates with the network including initiating a new connection or refreshing an existing connection that has somehow become stale, such as for example where synchronization between the user equipment and the network access point has been lost.

As part of a low level acquisition process, when attempting to initiate a connection to a network having a cellular structure, the user equipment can at least sometimes attempt to discover and acquire signaling from each of the nearby cells. This can involve receiving corresponding synchronization signals, which can include a respective primary and a respective secondary synchronization signal. In LTE, acquisition of a primary synchronization signal is initially attempted from which symbol timing and a partial cell identification can be determined. Various determinations of cross-correlations relative to a received signal with each of a predetermined set of synchronization signals can be used to determine the likely partial cell identification, such as the physical layer identity. Further more detailed information can then be determined through a subsequent acquisition of a secondary synchronization signal, including the frame timing, the rest of the cell identity, as well as other potential communication details, such as transmission mode and/or cyclic prefix duration.

The present inventors have recognized, that the manner in which the predetermined set of synchronization signals including the secondary synchronization signals are selected from a list of possible sequences, and are mapped for use to the various cells and the corresponding cell identities can determine the relative ease with which the synchronization signal can be received and distinguished. By limiting which sequences can be used together including defining a mapping rule between a cell identity (ID) and relative cyclic shifts of multiple maximum length sequences, the cross-correlation performance can be enhanced, so that the potential for cell ID confusion during cell detection can be reduced.

SUMMARY

Presently, user equipment, such as wireless communication devices, communicate with other communication devices using wireless signals. According to a possible embodiment, a method is provided. The method includes determining a set of sequence values to be used as synchronization signal sequences, the set of sequence values having a predetermined length. Each sequence value in the set is based upon a first maximum length sequence having a first cyclic shift, and is based upon a second maximum length sequence having a second cyclic shift. For at least one group of possible sequence values from the determined set, where a value of a cyclic shift difference between the second cyclic shift of the second maximum length sequence and the first cyclic shift of the first maximum length sequence upon which each of the possible sequence values in the group are based are equal, a cyclic shift difference between the respective first cyclic shift value of the first maximum length upon which each of the possible sequence values in the group are based for any two of the possible sequence values in the group are larger than or equal to a threshold value, where the threshold value is determined based on an expected maximum carrier frequency offset value. The method further includes assigning each one of the determined set of sequence values to respective at least one communication target of a plurality of communication targets.

According to a possible embodiment, a method in a user equipment is provided. The method includes establishing a set of a plurality of synchronization signal sequences to be used in connection with at least one communication target, the set of the plurality of synchronization signal sequences having a predetermined length. Each synchronization signal sequence in the set is based upon a first maximum length sequence having a first cyclic shift and a second maximum length sequence having a second cyclic shift, and corresponds to a respective identity of a plurality of identities associated with a respective communication target. For at least one group of possible synchronization signal sequences from the established set, where a value of a cyclic shift difference between the second cyclic shift of the second maximum length sequence and the first cyclic shift of the first maximum length sequence upon which each of the possible synchronization signal sequences in the group are based are equal, a cyclic shift difference between the respective first cyclic shift value of the first maximum length upon which each of the possible synchronization signal sequences in the group are based for any two of the possible synchronization signal sequences in the group are larger than or equal to a threshold value, where the threshold value is determined based on an expected maximum carrier frequency offset value. The method further includes receiving a downlink signal including a synchronization signal, where the synchronization signal comprises one of the set of synchronization signal sequences, and detecting the synchronization signal.

According to a possible embodiment, a user equipment in a communication network is provided. The user equipment includes a transceiver, and a controller coupled to the transceiver. The controller determines a set of sequence values to be used as synchronization signal sequences, the set of sequence values having a predetermined length, wherein each sequence value in the set is based upon a first maximum length sequence having a first cyclic shift, and is based upon a second maximum length sequence having a second cyclic shift, and wherein for at least one group of possible sequence values from the determined set, where a value of a cyclic shift difference between the second cyclic shift of the second maximum length sequence and the first cyclic shift of the first maximum length sequence upon which each of the possible sequence values in the group are based are equal, a cyclic shift difference between the respective first cyclic shift value of the first maximum length upon which each of the possible sequence values in the group are based for any two of the possible sequence values in the group are larger than or equal to a threshold value, where the threshold value is determined based on an expected maximum carrier frequency offset value. Each one of the determined set of sequence values is associated with respective at least one communication target.

These and other objects, features, and advantages of the present application are evident from the following description of one or more preferred embodiments, with reference to the accompanying drawings.

BRIEF DESCRIPTION OF THE DRAWINGS

FIG. 2 is a table of primary synchronization signal sequence to secondary synchronization signal sequence, and secondary synchronization signal sequence to secondary synchronization signal sequence cross-correlation performance comparisons for two different identity to secondary synchronization signal sequence mapping schemes;

DETAILED DESCRIPTION OF THE PREFERRED EMBODIMENT(S)

Figure 1:
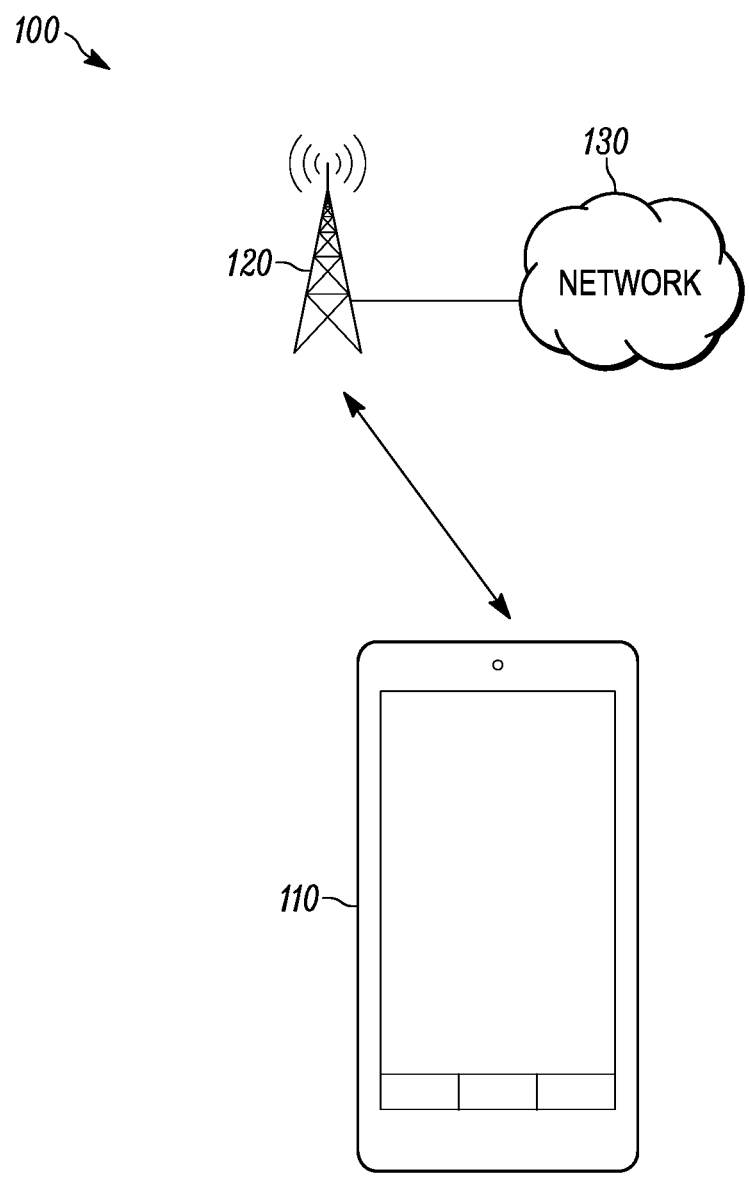
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for mapping of cell identities to synchronization signal sequences.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

In a fifth generation (5G) radio access technology (RAT) based wireless network, the number of cells generally meaningfully increases for area capacity enhancement and for use of high frequency bands. Thus, synchronization signal (SS) sequences carrying cell identities (ID) should have good cross-correlation performances to allow flexible network deployment without complex cell ID planning and for reducing potential cell ID confusion at a user equipment (UE). Furthermore, the cross-correlation performance should be robust to carrier frequency offset (CFO), as the UE has to detect the SS sequences without perfect timing and frequency synchronization.

In 3GPP new RAT (NR), three primary synchronization signal (PSS) sequences were defined as follows:
frequency domain-based pure binary phase shift keying (BPSK) maximum length sequence (M sequence)
1 polynomial: decimal 145 (i.e. $g(x)=x^7+x^4+1$)
3 cyclic shifts (0, 43, 86) in the frequency domain to get the 3 PSS sequences
Initial polynomial shift register values: 1110110
According to 3GPP TS 38.211 V15.0.0, the sequence $d_{PSS}(n)$ for the primary synchronization signal is defined by $$d_{PSS}(n)=1-2x(m)$$

$$m=(n+43N_{ID}^{(2)}) \bmod 127$$

$$0 \leq n \leq 127$$

where $N_{ID}^{(2)}$ is a PSS sequence index, $$x(i+7)=(x(i+4)+x(i)) \bmod 2$$

and $$[x(6)x(5)x(4)x(3)x(2)x(1)x(0)]=[1\ 1\ 1\ 0\ 1\ 1\ 0].$$

Secondary synchronization signal (SSS) sequences can be generated via element-wise multiplication of two BPSK m-sequences, each with its own cyclic shift. If two generator polynomials for m-sequences are preferred-pair of m-sequences, the SSS sequences are Gold sequences and their cyclic shifts. For example, two generator polynomials can be $g_0(x)=x^7+x^4+1$ and $g_1(x)=x^7+x+1$ with initial state [0000001]. Considering that residual CFO due to estimation error and/or high Doppler spread may exist even after PSS based CFO estimation and compensation, SSS sequences should have good cross-correlation performances at least under CFO of up to +/−0.5 subcarrier spacing.

This present disclosure presents methods to select a set of SSS sequences, such as from given Gold sequences and their cyclic shifts, which has robust cross-correlation performances under CFO, by defining a proper mapping rule between a cell ID and cyclic shifts of two m-sequences used for the Gold sequences.

The mapping of a cell ID to a SSS sequence in at least some alternative instances including according to the proposal in the reference R1-1708160, entitled "Remaining details for synchronization signals", shown below, may cause cell ID confusion at UE with residual CFO in multi-cell environments.

$$m_0 = 3 \cdot \left\lfloor \frac{N_{ID}^{(1)}}{112} \right\rfloor + N_{ID}^{(2)},$$

$$m_1 = (N_{ID}^{(1)} \bmod 112) + m_0 + 1,$$

where $N_{ID}^{cell} = N_{ID}^{(1)} \cdot 3 + N_{ID}^{(2)}$, where $N_{ID}^{(2)} = 0, 1, 2$ and $N_{ID}^{(1)} = 0, 1, \ldots, 335$.

This is because the proposed mapping in said identified proposal, namely R1-1708160, generates one or more SSS sequence pairs, wherein, in each SSS sequence pair, one sequence is 1-cyclic shift of the other sequence.

According to a possible embodiment of the present application, the length-L SSS sequences $d(0), \ldots, d(L-1)$ based on 2 preferred-pair m-sequences can be described as follows:

$$d(n) = 1 - 2((c_0^{(m0)}(n) + c_i^{(m1)}(n)) \bmod 2), n = 0, 1, \ldots, L-, \quad (1)$$

where $$c_0^{(m0)}(n) = s_0((n + m_0) \bmod L),$$

$$c_0^{(m1)}(n) = s_1((n + m_1) \bmod L),$$

and $s_0(n)$ and $s_1(n)$ are two m-sequences, for example, with generator polynomials $g_0(x) = x^7 + x^4 + 1$ and $g_1(x) = x^7 + x + 1$, respectively, and initial state [0000001]. The cyclic shift values $m_0$ and $m_1$ are determined by a cell ID, $N_{ID}^{cell}$, which is a function of an NR PSS sequence index $N_{ID}^{(2)}$ and an NR SSS sequence index $N_{ID}^{(1)}$, for example, $N_{ID}^{cell} = N_{ID}^{(1)} \cdot 3 + N_{ID}^{(2)}$, where $N_{ID}^{(2)} = 0, 1, 2$ and $N_{ID}^{(1)} = 0, 1, \ldots, 335$. Equivalently, the sequence $d(n)$ for the secondary synchronization signal can be described as element-wise multiplication of two BPSK m-sequences as follows:

$$d(n) = [1 - 2x_0((n + m_0) \bmod L)][1 - 2x_1((n + m_1) \bmod L)]$$

$$0 \le n \le L$$

where $$x_0(i+7) = (x_0(i+4) + x_0(i)) \bmod 2$$

$$x_1(i+7) = (x_1(i+1) + x_1(i)) \bmod 2$$

and $$[x_0(6) x_0(5) x_0(4) x_0(3) x_0(2) x_0(1) x_0(0)] = [0\ 0\ 0\ 0\ 0\ 0\ 1]$$

$$[x_1(6) x_1(5) x_1(4) x_1(3) x_1(2) x_1(1) x_1(0)] = [0\ 0\ 0\ 0\ 0\ 0\ 1]$$

In one embodiment, any two SSS sequences having the common $(m_1 - m_0)$ value have two different $m_0$ values, wherein $m_1$ is larger than $m_0$, and a magnitude of a difference of the two $m_0$ values is larger than a first value, wherein the first value is dependent on the maximum allowed (or expected) residual CFO. In one example, the first value is the nearest integer larger than a magnitude of the maximum allowed (or expected) residual CFO. In equation (1), a unique SSS sequence is determined by the values $m_0$ and $(m_1 - m_0)$, where $m_0 = 0, 1, \ldots, L-1$, and $m_1 - m_0 = 0, 1, \ldots, L-1$. Thus, the total number of unique sequences which can be generated from the above equation (1) are $L^2$. Further, L sequences from L pairs of $(m_0, m_1)$, which result in the same $(m_1 - m_0)$ value, are L cyclic shifted versions of one sequence. Assuming that the above SSS sequences are directly mapped to consecutive subcarriers in the frequency domain, any two SSS sequences which are 1-cyclic shift of each other may suffer from high cross-correlation in frequency domain due to residual CFO up to +/−0.5 subcarrier spacing, wherein the subcarrier spacing refers to the subcarrier spacing of PSS and SSS. Thus, among a set of SSS sequences, any two SSS sequences having the common $(m_1 - m_0)$ value should have 2 or larger difference for the $m_0$ value so that the two SSS sequences are two or more cyclic shifts of each other.

In one example, cyclic shifts $m_0$ and $m_1$ applied to generate a SSS sequence are determined as follows:

$$m_0 = ab \cdot \left\lfloor \frac{N_{ID}^{(1)}}{\lceil c/b \rceil} \right\rfloor + a \cdot N_{ID}^{(2)},$$

$$m_1 = (N_{ID}^{(1)} \bmod \lceil c/b \rceil) + m_0 + 1,$$

where a is the nearest integer larger than a magnitude of the maximum allowed (or expected) residual CFO, b is the number of PSS IDs, c is the number of SSS IDs. For 1008 cell IDs with 3 PSS IDs and 336 SSS IDs and the residual CFO up to +/−0.5 subcarrier spacing (i.e. frequency uncertainty of up to 1 subcarrier spacing), cyclic shifts $m_0$ and $m_1$ for a length-127 SSS sequence are determined as follows:

$$m_0 = 6 \cdot \left\lfloor \frac{N_{ID}^{(1)}}{112} \right\rfloor + 2 \cdot N_{ID}^{(2)}, \quad (2)$$

$$m_1 = (N_{ID}^{(1)} \bmod 112) + m_0 + 1 \quad (3)$$

In another example, cyclic shifts $m_0$ and $m_1$ for a length-L SSS sequence is determined as follows:

$$m_0 = a \cdot \left\lfloor \frac{N_{ID}^{cell}}{L} \right\rfloor, \ m_1 = (N_{ID}^{cell} \bmod L) + m_0,$$

where the cell ID NV is a function of a PSS ID and a SSS ID, and a is the nearest integer larger than a magnitude of the maximum allowed (or expected) residual CFO. In an alternative example, $$m_0 = a \cdot b \left\lfloor \frac{N_{ID}^{(1)}}{L} \right\rfloor + a \cdot N_{ID}^{(2)},$$

$$m_1 = (N_{ID}^{(1)} \bmod L) + m_0,$$

where a is the nearest integer larger than a magnitude of the maximum allowed (or expected) residual CFO, b is the number of PSS IDs.

FIG. 2 is a table 200 of primary synchronization signal sequence to secondary synchronization signal sequence, and secondary synchronization signal sequence to secondary synchronization signal sequence cross-correlation performance comparisons for two different identity to secondary synchronization signal sequence mapping schemes. In the illustrated table, PSS-SSS and SSS-SSS cross-correlation performances are presented for two different cell ID to SSS sequence mapping schemes. The first row 210 represents the performance in accordance with the cited reference, R1-1708160, and the second row 220 represents the performance in accordance with equations (2) and (3) in accordance with the teachings of at least one embodiment of the present application.

In the table, a first column 230 corresponds to a maximum primary synchronization signal sequence to secondary synchronization signal sequence cross-correlation power normalized by peak primary synchronization signal sequence auto-correlation power with multiple integer carrier frequency offset hypothesis for a network having 1008 cell IDs, and a carrier frequency offset in the range of −3 to 3 sub-carrier spacing with a correlation in the time-domain. A second column 240 corresponds to a maximum secondary synchronization signal sequence cross-correlation power normalized by secondary synchronization signal sequence auto-correlation power with carrier frequency offset for a network having 1008 cell IDs, and a carrier frequency offset in the range of −0.5 to 0.5 sub-carrier spacing with a correlation in the frequency-domain.

In the table, it is shown that the proposed mapping according to equations (2) and (3) can avoid high SSS cross-correlation, while the mapping scheme in the above noted reference, R1-1708160, suffers from a normalized SSS cross-correlation power close to 1. The proposed mapping according to equations (2) and (3) noted above related to the teachings of at least one embodiment of the present application alternatively produces a normalized SSS cross-correlation power, which is approximately 0.4246.

Figure 3:
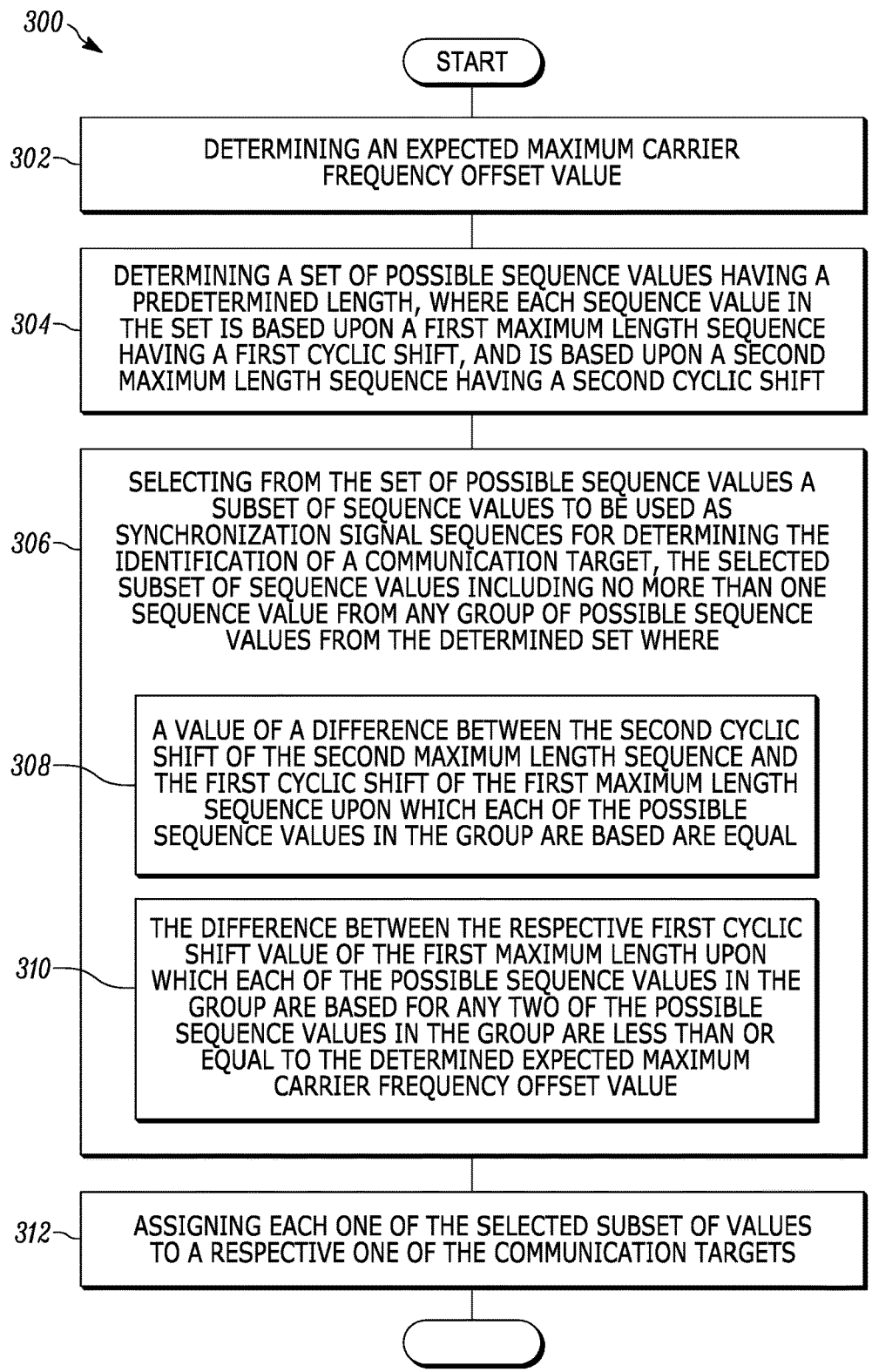
FIG. 3 is a flow diagram of a method for establishing a set of a plurality of synchronization signal sequences to be used in determining the identification of a communication target.

FIG. 3 is a flow diagram 300 of a method for establishing a set of a plurality of synchronization signal sequences to be used in determining the identification of a communication target, according to a possible embodiment. The method provides for determining 302 an expected maximum carrier frequency offset value, and determining 304 a set of possible sequence values having a predetermined length, where each sequence value in the set is based upon a first maximum length sequence having a first cyclic shift, and is based upon a second maximum length sequence having a second cyclic shift. A subset of sequence values to be used as synchronization signal sequences for determining the identification of a communication target is selected 306 from the set of possible sequence values. The selected subset of sequence values includes no more than one sequence value from any group of possible sequence values from the determined set where (a) a value of a difference between the second cyclic shift of the second maximum length sequence and the first cyclic shift of the first maximum length sequence upon which each of the possible sequence values in the group are based are equal 308, and (b) the difference between the respective first cyclic shift value of the first maximum length upon which each of the possible sequence values in the group are based for any two of the possible sequence values in the group are less than or equal to the determined expected maximum carrier frequency offset value 310. Each one of the selected subset of values are then assigned 312 to a respective one of the communication targets.

In at least some instances, the first maximum length sequence and the second maximum length sequence are each a binary phase shift keying maximum length sequence, and each of the possible sequence values is generated via an element-wise multiplication of the first maximum length sequence having a first cyclic shift and the second maximum length sequence having a second cyclic shift. In some of the same or other instances, the communication targets can include one or more network entities included as part of a network, where the network entities are each respectively associated with one or more communication areas, and where communication with the network can be facilitated via one of the one or more network entities.

In some instances, the selected subset of sequence values can be respectively associated with a secondary synchronization signal, where the secondary synchronization signal is mapped and transmitted on consecutive subcarriers in a frequency domain. In some of these instances, a primary synchronization signal associated with the communication target can be used with the secondary synchronization signal to determine a physical identity value for the communication target, where in addition to a physical identity value for the communication target, the primary synchronization signal and the secondary synchronization signal associated with a particular communication target can be used to determine at least some communication characteristics for use with subsequent communications with the communication target.

Figure 4:
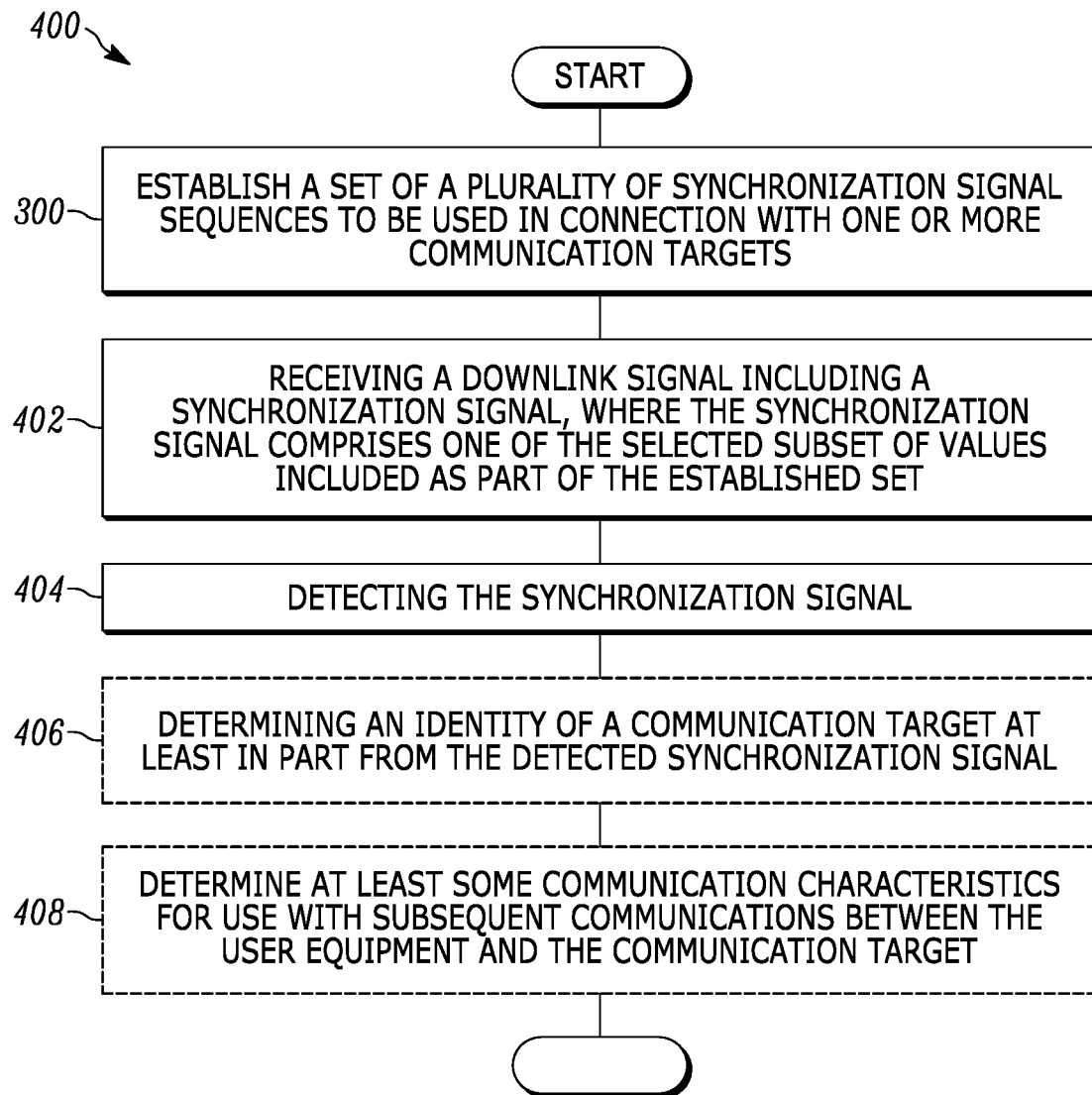
FIG. 4 is a flow diagram in a user equipment for receiving a mapped synchronization signal sequence.

FIG. 4 is a flow diagram 400 in a user equipment for receiving a mapped synchronization signal sequence. The method includes establishing a set of a plurality of synchronization signal sequences to be used in connection with one or more communication targets. In at least some instances, the set of plurality of synchronization signal sequences can be established 300 as outlined in FIG. 3, including the subsequent assignment of each one of the selected subset of values included as part of the established set to a respective one of the communication targets. The downlink signal including a synchronization signal is then received 402, where the synchronization signal comprises one of the selected subset of values included as part of the established set. The synchronization signal is then detected 404.

In some instances, an identity of a communication target can be determined 406 at least in part from the synchronization signal, which is detected.

In some instances, the selected subset of sequence values can be respectively associated with a secondary synchronization signal, where the secondary synchronization signal is mapped and transmitted on consecutive subcarriers in a frequency domain. In some of these instances, a primary synchronization signal associated with the communication target can be used with the secondary synchronization signal to determine a physical identity value for the communication target, where in addition to a physical identity value for the communication target, the primary synchronization signal and the secondary synchronization signal associated with a particular communication target can be used to determine 408 at least some communication characteristics for use with subsequent communications with the communication target.

In some of the same or other instances, the first maximum length sequence and the second maximum length sequence are each a binary phase shift keying maximum length sequence, and each of the possible sequence values can be generated via an element-wise multiplication of the first maximum length sequence having a first cyclic shift and the second maximum length sequence having a second cyclic shift.

The communication targets can include one or more network entities included as part of a network, where the network entities are each respectively associated with one or more communication areas, and where communication with the network by the user equipment can be facilitated via one of the one or more network entities. The communication target can additionally and/or alternatively include a direct communication connection with another user equipment.

Figure 5:
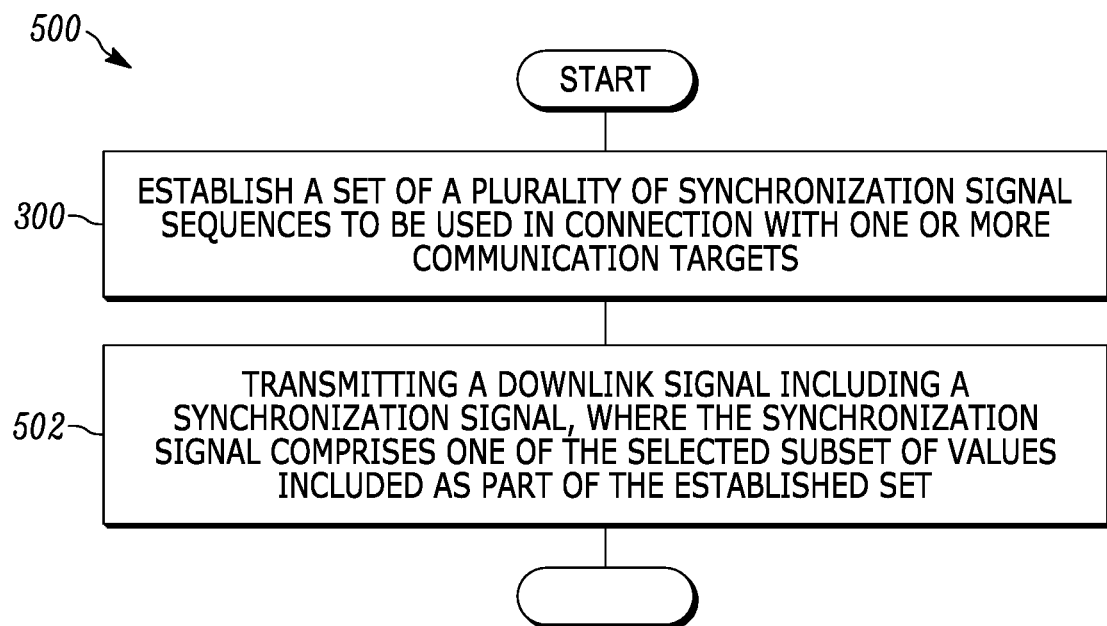
FIG. 5 is a flow diagram in a network entity for transmitting a mapped synchronization signal sequence.

FIG. 5 is a flow diagram 500 in a network entity for transmitting a mapped synchronization signal sequence. The method similar to the flow diagram illustrated in FIG. 4, can include establishing a set of a plurality of synchronization signal sequences to be used in connection with one or more communication targets. In at least some instances, the set of plurality of synchronization signal sequences can be established 300 as outlined in FIG. 3, including the subsequent assignment of each one of the selected subset of values included as part of the established set to a respective one of the communication targets. The downlink signal including a synchronization signal is then transmitted 502, where the synchronization signal comprises one of the selected subset of values included as part of the established set.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 6:
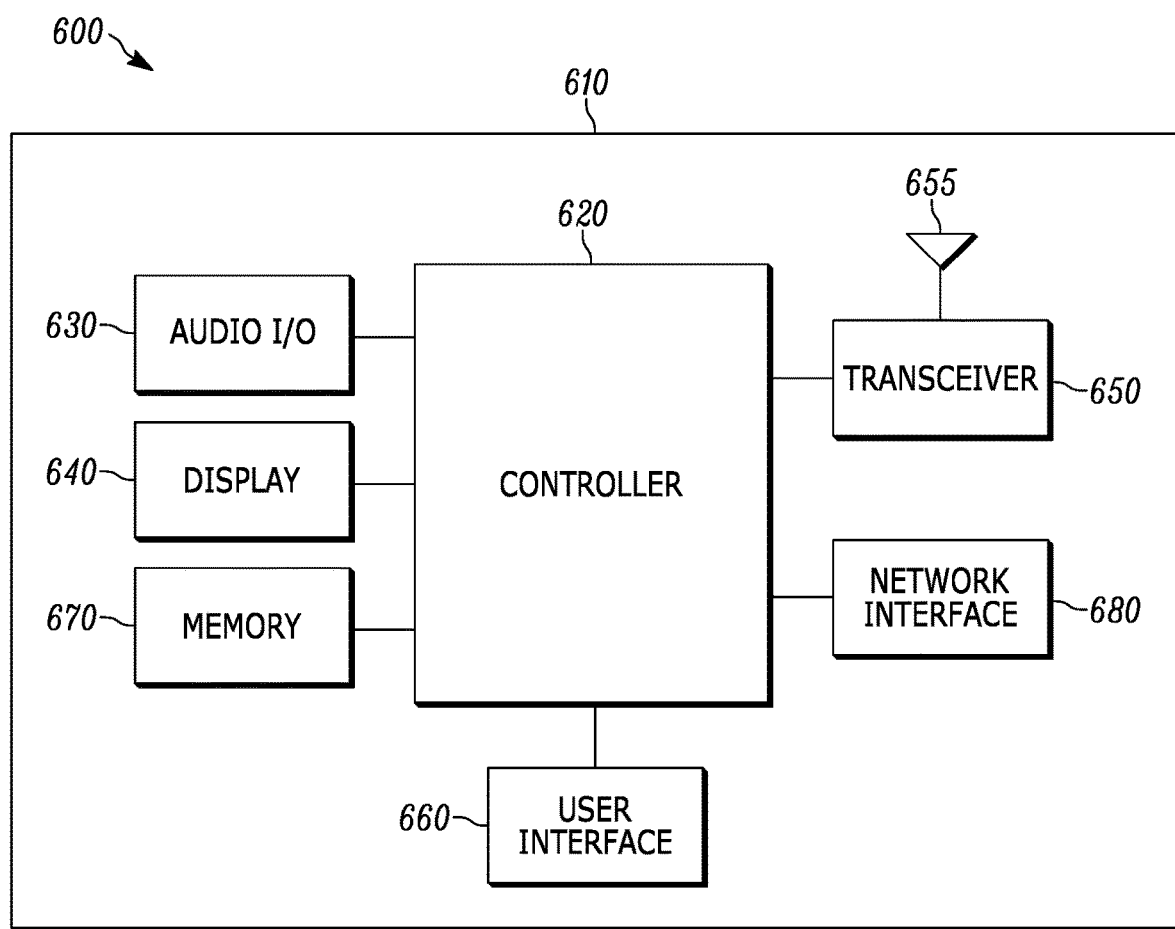
FIG. 6 is an example block diagram of an apparatus according to a possible embodiment.

FIG. 6 is an example block diagram of an apparatus 600, such as the wireless communication device 110, according to a possible embodiment. The apparatus 600 can include a housing 610, a controller 620 within the housing 610, audio input and output circuitry 630 coupled to the controller 620, a display 640 coupled to the controller 620, a transceiver 650 coupled to the controller 620, an antenna 655 coupled to the transceiver 650, a user interface 660 coupled to the controller 620, a memory 670 coupled to the controller 620, and a network interface 680 coupled to the controller 620. The apparatus 600 can perform the methods described in all the embodiments The display 640 can be a viewfinder, a liquid crystal display (LCD), a light emitting diode (LED) display, a plasma display, a projection display, a touch screen, or any other device that displays information. The transceiver 650 can include a transmitter and/or a receiver. The audio input and output circuitry 630 can include a microphone, a speaker, a transducer, or any other audio input and output circuitry. The user interface 660 can include a keypad, a keyboard, buttons, a touch pad, a joystick, a touch screen display, another additional display, or any other device useful for providing an interface between a user and an electronic device. The network interface 680 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 670 can include a random access memory, a read only memory, an optical memory, a solid state memory, a flash memory, a removable memory, a hard drive, a cache, or any other memory that can be coupled to an apparatus.

The apparatus 600 or the controller 620 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 670 or elsewhere on the apparatus 600. The apparatus 600 or the controller 620 may also use hardware to implement disclosed operations. For example, the controller 620 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 620 may be any controller or processor device or devices capable of operating an apparatus and implementing the disclosed embodiments. Some or all of the additional elements of the apparatus 600 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method comprising:
   determining a set of sequence values to be used as synchronization signal sequences, the set of sequence values having a predetermined length,
      wherein each sequence value in the set is based upon a first maximum length sequence having a first cyclic shift, and is based upon a second maximum length sequence having a second cyclic shift; and
      wherein for at least one group of possible sequence values from the determined set, where a value of a first cyclic shift difference between the second cyclic shift of the second maximum length sequence and the first cyclic shift of the first maximum length sequence upon which each of the possible sequence values in the group are based are equal, and a second cyclic shift difference between the respective first cyclic shift value of the first maximum length upon which each of the possible sequence values in the group are based for any two of the possible sequence values in the group are larger than or equal to a threshold value, where the threshold value is determined based on an expected maximum carrier frequency offset value; and
   assigning each one of the determined set of sequence values to respective at least one communication target of a plurality of communication targets, which includes each of the assigned ones of the determined set of sequence values being communicated to the respective at least one communication target of the plurality of communication targets.

2. A method in accordance with claim 1, wherein the first maximum length sequence and the second maximum length sequence are each a binary phase shift keying maximum length sequence, and each of the possible sequence values is generated via an element-wise multiplication of the first maximum length sequence having the first cyclic shift and the second maximum length sequence having the second cyclic shift.

3. A method in accordance with claim 1, wherein the plurality of communication targets include at least one network entity included as part of a network, where the at least one network entity are each respectively associated with at least one communication area, and where communication with the network can be facilitated via one of the at least one network entity.

4. A method in accordance with claim 1, wherein the determined set of sequence values respectively correspond to a secondary synchronization signal associated with a communication target.

5. A method in accordance with claim 4, wherein the secondary synchronization signal is mapped and transmitted on consecutive subcarriers in a frequency domain.

6. A method in accordance with claim 4, wherein a primary synchronization signal associated with the communication target is used with the secondary synchronization signal to determine a physical identity value for the communication target.

7. A method in accordance with claim 6, where in addition to a physical identity value for the communication target, the primary synchronization signal and the secondary synchronization signal associated with a particular communication target can be used to determine at least some communication characteristics for use with subsequent communications with the communication target.

8. A method in a user equipment, the method comprising:
   establishing a set of a plurality of synchronization signal sequences to be used in connection with at least one communication target, the set of the plurality of synchronization signal sequences having a predetermined length,
      wherein each synchronization signal sequence in the set is based upon a first maximum length sequence having a first cyclic shift and a second maximum length sequence having a second cyclic shift, and corresponds to a respective identity of a plurality of identities associated with a respective communication target;
      wherein for at least one group of possible synchronization signal sequences from the established set, where a value of a first cyclic shift difference between the second cyclic shift of the second maximum length sequence and the first cyclic shift of the first maximum length sequence upon which each of the possible synchronization signal sequences in the group are based are equal, and a second cyclic shift difference between the respective first cyclic shift value of the first maximum length upon which each of the possible synchronization signal sequences in the group are based for any two of the possible synchronization signal sequences in the group are larger than or equal to a threshold value, where the threshold value is determined based on an expected maximum carrier frequency offset value;
   receiving a downlink signal including a synchronization signal, where the synchronization signal comprises one of the set of synchronization signal sequences; and
   detecting the synchronization signal.

9. A method in accordance with claim 8, further comprising determining an identity of a communication target at least in part from the synchronization signal, which is detected.

10. A method in accordance with claim 8, wherein a synchronization signal sequence of the set corresponding to an identity associated with a communication target is used as a secondary synchronization signal.

11. A method in accordance with claim 10, wherein a primary synchronization signal corresponding to the communication target is used by the user equipment with the secondary synchronization signal to determine a physical identity value for the communication target, where the identity is a physical identity.

12. A method in accordance with claim 10, wherein the secondary synchronization signal is mapped and transmitted on consecutive subcarriers in a frequency domain.

13. A method in accordance with claim 11, where in addition to the physical identity value for the communication target, the primary synchronization signal and the secondary synchronization signal associated with the communication target can be used to determine at least some communication characteristics for use with subsequent communications between the user equipment and the communication target.

14. A method in accordance with claim 8, wherein the first maximum length sequence and the second maximum length sequence are each a binary phase shift keying maximum length sequence, and each of the possible sequence values is generated via an element-wise multiplication of the first maximum length sequence having a first cyclic shift and the second maximum length sequence having a second cyclic shift.

15. A method in accordance with claim 8, wherein the at least one communication target includes at least one network entity included as part of a network, where the at least one network entity is each respectively associated with at least one communication area, and where communication with the network by the user equipment can be facilitated via one of the at least one network entity.

16. A method in accordance with claim 8, wherein the at least one communication target includes a direct communication connection with another user equipment.

17. A user equipment in a communication network, the user equipment comprising:

a transceiver;

a controller coupled to the transceiver, that determines a set of sequence values to be used as synchronization signal sequences, the set of sequence values having a predetermined length, wherein each sequence value in the set is based upon a first maximum length sequence having a first cyclic shift, and is based upon a second maximum length sequence having a second cyclic shift, and wherein for at least one group of possible sequence values from the determined set, where a value of a first cyclic shift difference between the second cyclic shift of the second maximum length sequence and the first cyclic shift of the first maximum length sequence upon which each of the possible sequence values in the group are based are equal, and a second cyclic shift difference between the respective first cyclic shift value of the first maximum length upon which each of the possible sequence values in the group are based for any two of the possible sequence values in the group are larger than or equal to a threshold value, where the threshold value is determined based on an expected maximum carrier frequency offset value; and wherein each one of the determined set of sequence values is associated with respective at least one communication target;

wherein the transceiver receives a downlink signal including a synchronization signal, where the synchronization signal comprises one of the determined set of sequence values; and wherein the controller further detects the synchronization signal from the received downlink signal.

18. A user equipment in accordance with claim 17, wherein a communication target includes a network comprising at least one network entity respectively associated with at least one communication area, and the user equipment communicates with the network via the at least one network entity.

19. A user equipment in accordance with claim 18, wherein the controller uses the detected synchronization signal to identify at least a partial physical-layer cell identity of one of the at least one network entity.

* * * * *